Oct. 26, 1926.

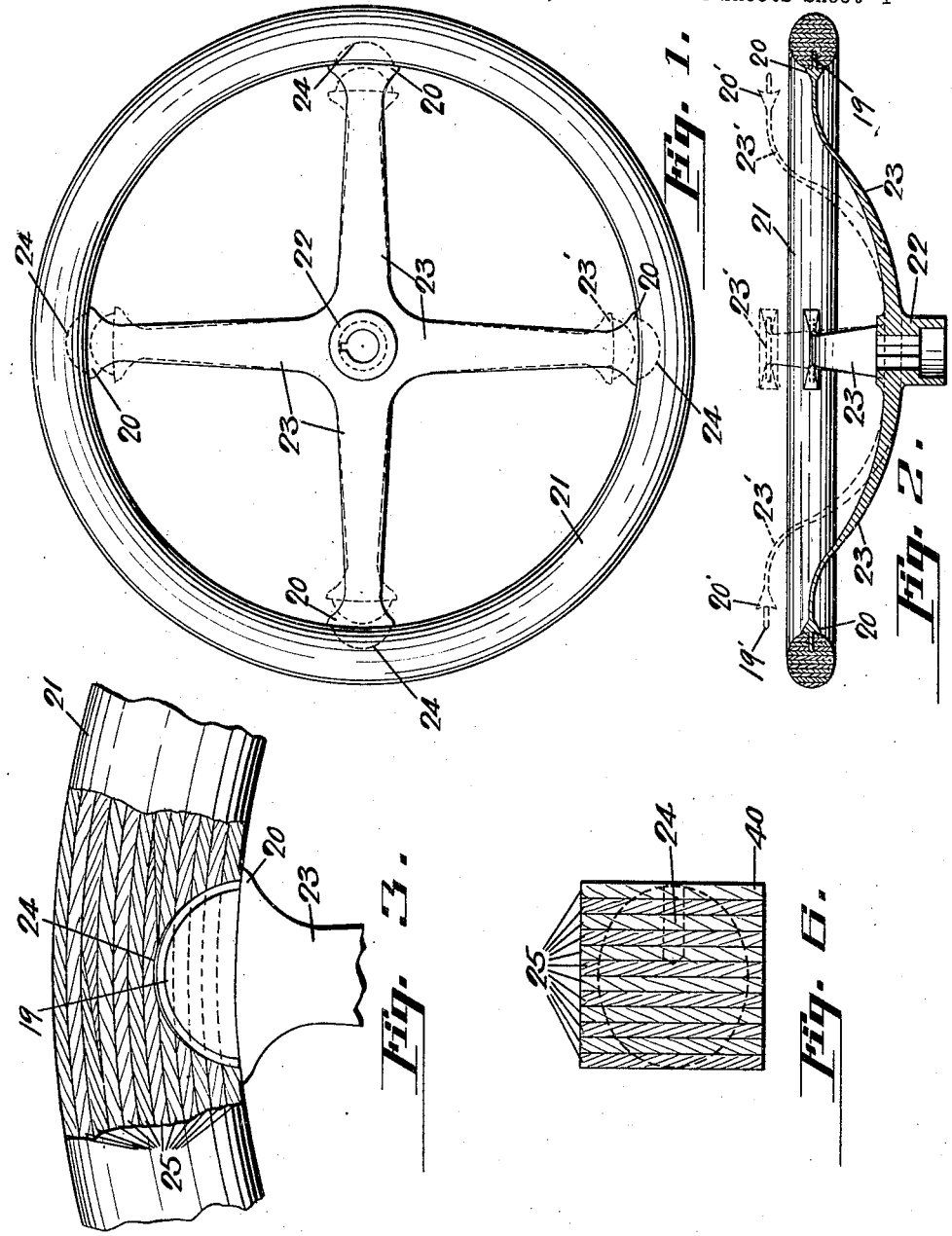

H. D. GEYER 1,604,275

STEERING WHEEL

Filed Jan. 17, 1922   4 Sheets-Sheet 2

Witness.
Elmer E. Freed
A. Bondar

By

Inventor.
Harvey D. Geyer.
Ralph H. Chilton
Attorney.

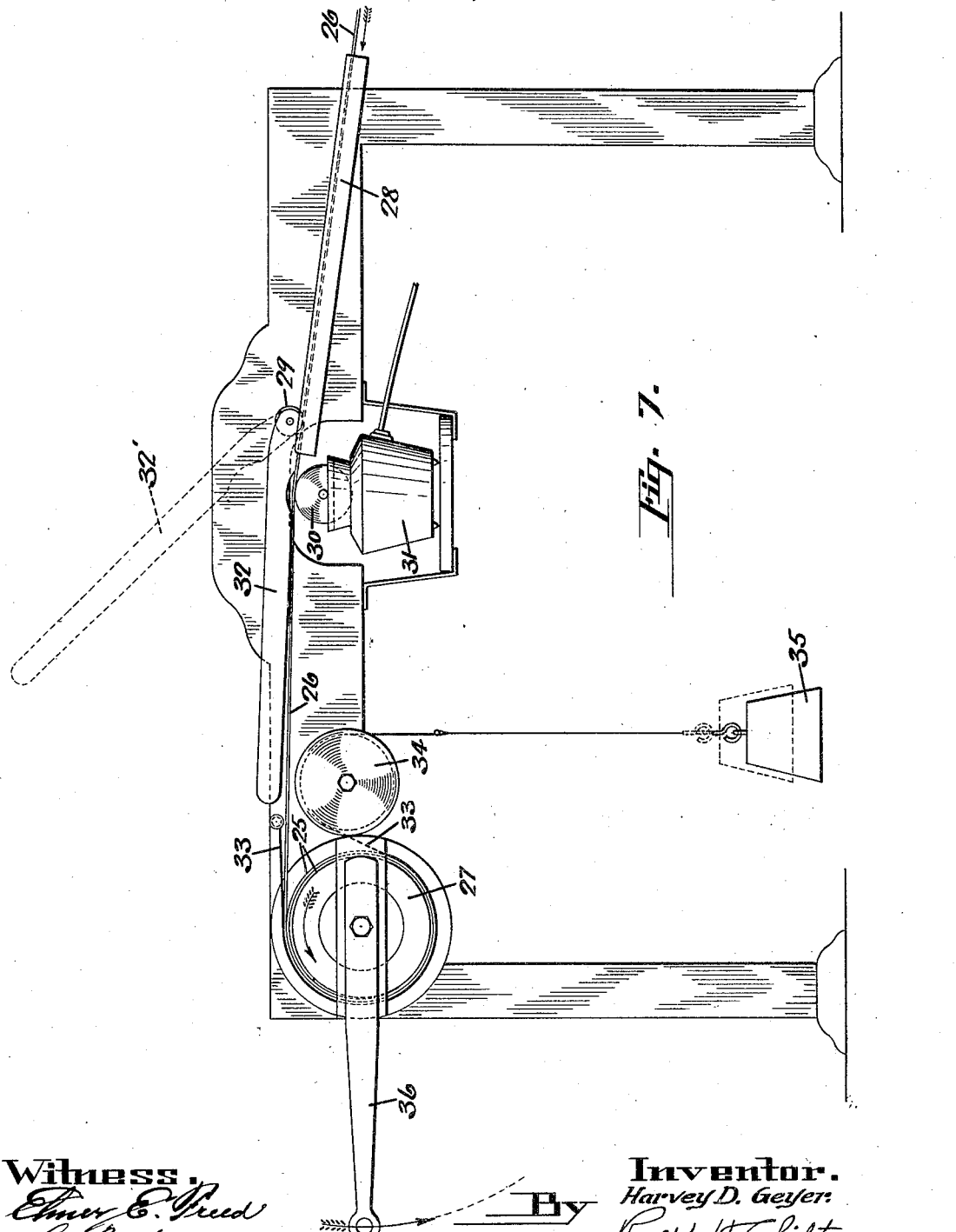

Oct. 26, 1926.
H. D. GEYER
STEERING WHEEL
Filed Jan. 17, 1922
1,604,275
4 Sheets-Sheet 4
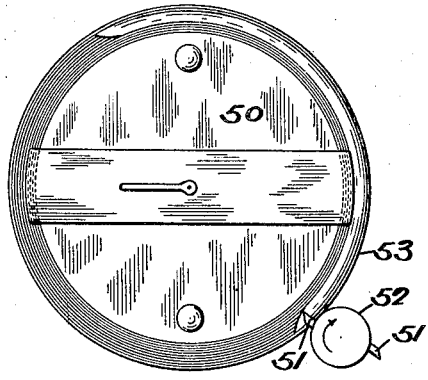
Fig. 8.
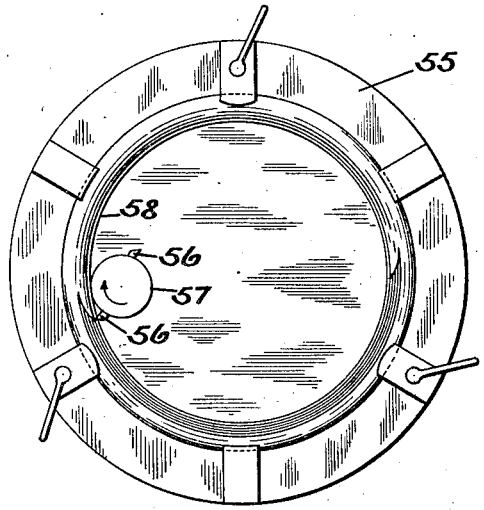
Fig. 9.
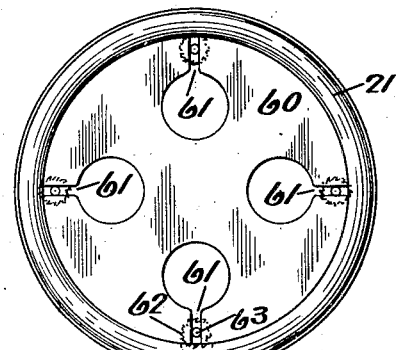
Fig. 10.
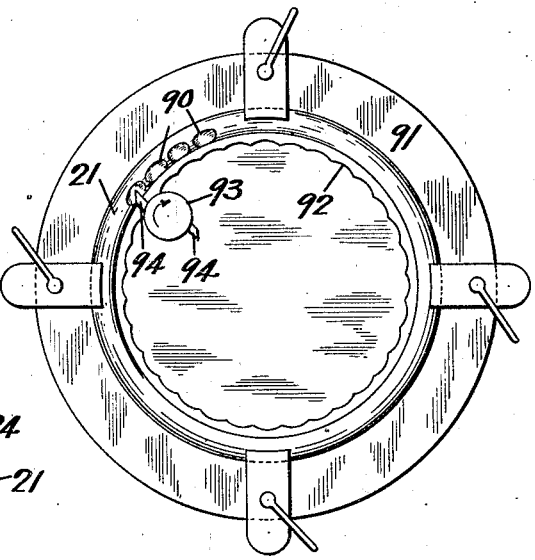
Fig. 11.
Fig. 12.
Witness.
Elmer E. Prus
A. Bondar
By
Inventor.
Harvey D. Geyer.
Ralph H. Chilton
Attorney.

Patented Oct. 26, 1926.

1,604,275

UNITED STATES PATENT OFFICE.

HARVEY D. GEYER, OF DAYTON, OHIO, ASSIGNOR, BY MESNE ASSIGNMENTS, TO THE INLAND MANUFACTURING COMPANY, OF DAYTON, OHIO, A CORPORATION OF DELAWARE.

STEERING WHEEL.

Application filed January 17, 1922. Serial No. 529,914.

This invention relates to handwheels or the like, and has particular reference to handwheels which are used in steering vehicles such as automobile steering wheels.

An object of this invention is an improved method of constructing the rim of a handwheel or the like by wrapping a strip of fibrous material around a form and suitably fastening the convolutions of the strip together, as by adhesive means.

Another object is the method of attaching the spider to the rim by distorting the spider in such a way as to increase its outer diameter beyond the desired final shape, thereby causing the spider arms to distort the rim a small amount and thus provide a tight contact between the spider arms and the rim after the distorting force has been removed.

Another object is the provision of means for gluing and wrapping the fibrous strip in a rapid and efficient manner.

Another object is the provision of means for expanding the central spider into place in a rapid and efficient manner.

Further objects and advantages of the present invention will be apparent from the following description, reference being had to the accompanying drawings, wherein preferred forms of embodiments of the present invention are clearly shown.

In the drawings:

Figs. 1 and 2 are the top and sectional views respectively of the handwheel made according to this invention and showing in dotted lines the form of the central spider before being pressed into place by means of the die press shown in Fig. 11.

Fig. 3 is a detail view having a portion cut away to show the fit of the spider arms within the holes in the rim provided therefor.

Figure 4:
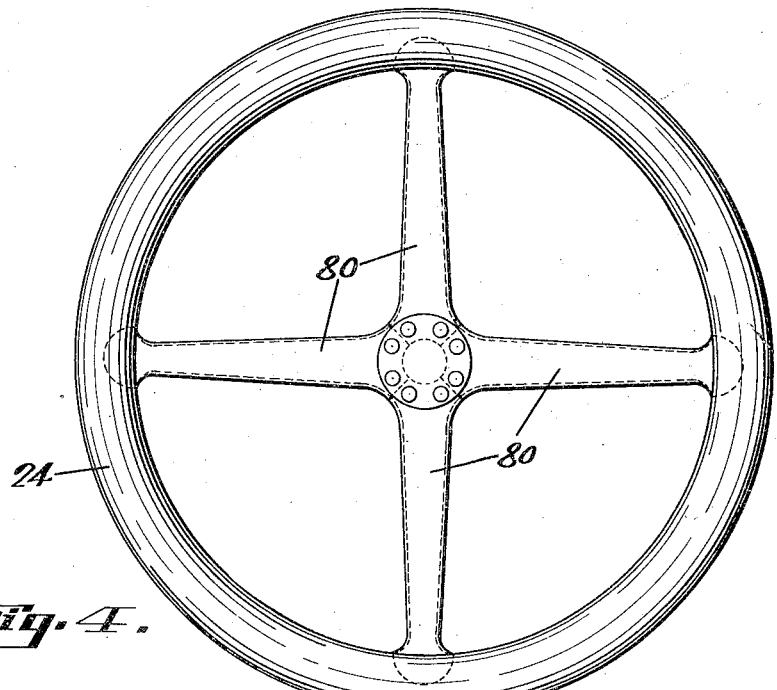
Fig. 4 is a top view of a modified form of wheel.

Figs. 6 to 12 inclusive illustrate one method of constructing the handwheel, Fig. 6 being a section through the laminated rim before it has been shaped as shown by the dotted lines.

Fig. 7 shows diagrammatically a machine for gluing and winding the fibrous strip into a laminated rim.

Fig. 8 illustrates the method for shaping the outer half section of the rim, and Fig. 9 the method for shaping the inner half section.

Fig. 10 illustrates the method of cutting holes in the inner periphery of the rim to receive the extremities of the spider arms.

Fig. 11 illustrates the method of forcing the spider to expand, thus causing the extremities of the spider arms to be inserted in the holes cut in the rim.

Fig. 12 illustrates a method of shaping the top inner quarter section of the rim so as to form an irregular grip thereon.

Similar reference characters refer to similar parts throughout the several views of the drawings.

In Figs. 1, 2, and 3 numeral 21 designates the rim of the completed handwheel, 22 the central hub, having the arms 23 integral therewith and extending within the holes or slots 24 on the inner periphery of the rim 21. The rim is composed of a plurality of laminations 25 of wood or other fibrous material which run in a circumferential direction around the rim.

Fig. 7 illustrates a method of winding a strip 26 of wood around a form 27 to form the laminated rim shown in Figs. 1 to 6. The strip 26 first enters the wrapping machine along guide 28, then passes under guide roller 29 and over the roller 30 which dips below the surface of the glue in the electrically heated glue pot 31, thus applying heated glue to the under side of the strip 26. A comparatively heavy lever 32 serves to guide and hold the strip 26 in contact with the glue roller 30 causing a uniform distribution of the adhesive material. The strip 26 then passes to the winding drum 27, the end of the strip being gripped to the periphery of the drum by suitable gripping means (not shown). As the drum 27 is revolved by means of the handle 36 the strip 26 is wrapped about the drum and is held tightly thereagainst by means of the flexible steel band 33 which extends over the guide pulley 34 and which is held under constant tension by the suspended weight 35. Of course as the wrapping drum 27 winds the layers 25 of the strip 26 upon itself the weight 35 is raised to accommodate the increased diameter. The total radial thickness of the unshaped rim is preferably determined by the length of the strip 26 fed into the wrapping machine. I have found that when strips of wood $\frac{1}{8}''$ thick by $1\frac{1}{2}''$ wide are fed into the machine about fifty-five feet are required to make an ordinary sized automobile steering rim. Of course the thickness of the strips can be increased for the more flexible woods and in such cases a shorter length is required. I may form the total lengths of the strip by splicing shorter strips together before running the strip into the machine. It is to be understood that the apparatus illustrated in Fig. 7 is diagrammatic and that a machine used for producing the wrapped rims in quantity will be operated by power means instead of by hand as shown and preferably will have spring pressed rollers arranged radially around the winding drum 27 to hold the coils 25 tightly together instead of using the steel band 33. The adhesive material used in the glue pot 31 is preferably waterproof glue and I have found both casein glue and hide glue satisfactory.

After the glue has set sufficiently the unshaped rim 40, shown in section in Fig. 6, is clamped in the internal chuck 50 as shown in Fig. 8, and the outer half section shaped down by the cutters 51. The cutting edges of these cutters 51 are given a semi-circular or semi-elliptical contour to give the desired shape to the rim section as shown by the dotted lines in Fig. 6. A guide collar 52 on the rotating cutter head rides upon the outer periphery 53 of the chuck 50 and thus guides the cutters around the rim.

The rim is then removed from the internal chuck 50 and clamped in the external chuck 55 as shown in Fig. 9. The inner half section of the rim is then shaped down by the cutters 56 which are formed similarly to the cutters 51. Also the guide collar 57 rides upon the inner periphery 58 of the chuck 55 and thus acts as a guide for the cutters 56.

The rim 21, now in the desired sectional shape, is removed from the chuck 55 and placed in a guide form 60, which is provided with the guide slots 61 for the routing wheel 62. (See Fig. 10). The shank 63 of the routing wheel 62 determines the depth to which the holes 24 are cut in the rim.

The central spider is first formed with its arm 23 in the position as shown by the dotted lines 23' in Fig. 2. It is thus seen that the outer diameter of the spider is sufficiently small to permit the spider being inserted in the holes 24 cut in the inner periphery of the rim 21. The spider is placed upon a die press having the male and female die member 70 and 71 and the rim 21 placed in position so that the holes 24 lie opposite the extremities of the arms 23. Now when the pressure is applied the arms 23 are straightened out by the die members 70 and 71 until the shoulders 20 near the ends of arms 23 are forced against the inner surface of the rim 21 with a very high pressure, the tongues 19 of course entering the recesses 24 but the radial pressure of the arms 23 against the rim being taken only by the shoulders 20. The spider is composed of some malleable material such as malleable iron, aluminum, bronze or other malleable metal. Since there is a tendency for the ends of the arms to retract slightly when the pressure on the dies is removed, the pressure upon the dies is made sufficiently great to deform the rim 21 a small amount. Then when the pressure is released and the arms 23 retract slightly this travel is taken up by the elastic tendency of the rim to return to its original shape. By this means a high pressure is obtained between the shoulders 20 and the rim even after the die pressure is removed, which insures a tight snug fit as shown in Fig. 3 of the drawing.

Figure 5:
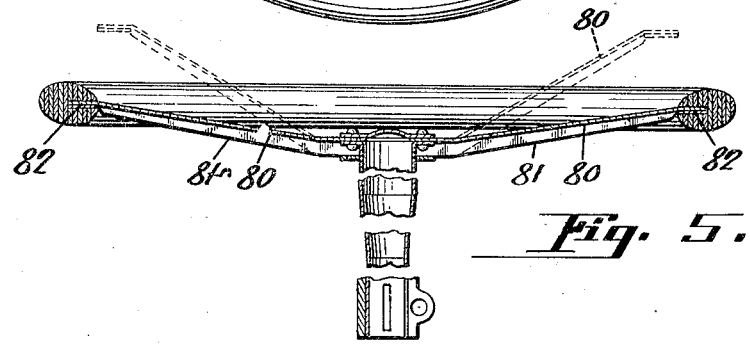
Fig. 5 is a section through the wheel of Fig. 4.

Figs. 4 and 5 illustrate a modification in which the central spider is made up of pressed steel members and riveted together. The spider arms 80 have stiffening flanges 81 as shown. When the arms are in the initial position as shown in dotted lines at 80' (Fig. 5) the flanges 81 are bent so as to make only a small angle with the flat portion of the arm and hence have only a small stiffening effect upon the arm. This permits the arms 80 to be bent in a similar manner to that described and illustrated in Fig. 11 for expanding the spider into the rim. In this modification I have not shown the arms 80 provided with shoulders, the pressure between the arms and rim being taken at the bottom of the recesses cut in the rim. After the spider has been expanded so that the extremities 82 of its arms 80 are forced tightly against the rim the flanges 81 are turned down at right angles to the flat portion of the arms thus greatly increasing the stiffening effect of the flanges 81 and causing the arms 80 to remain in the expanded position. The flanges 81 may be turned down to the right angle position by the die itself by so shaping the die that the pressure comes against the angularly disposed flanges. Now when this pressure increases to a high value, as it does when the arms have been pressed down against the lower die member the flanges 81 are turned downward. The ends 83 of the arms 80 may be given a larger bearing surface against the rim 24 by turning over the metal to form a double thickness as shown in Fig. 5.

Fig. 12 illustrates a method of cutting corrugated hand grips 90 on the rim by a shaper operation. The rim 21 is clamped in an external chuck 91 similar to chuck 55 shown in Fig. 9 with the exception that the integral guide periphery 92 for the guide collar 93 on the revolving cutter head is scalloped as shown. The cutter tools 94 are shaped so that they cut only the inner top quadrant of the rim. It is obvious that the guide collars 93 riding along the scalloped guide 92 will cause the cutter tools to form the corrugations 90 in the rim. The inner top quadrant of the rim is the most effective and advantageous location for the corrugations since both the thumb and the tops of the fingers come in contact with the corrugations, or if the rim is grasped only loosely then the pressure of the thumb falls upon the corrugations.

While I have illustrated and described a method of cutting the rough wrapped rim by means of a shaper operation it is entirely within the scope of my invention to shape the rough rim to the desired form by means of a turning or lathe operation, as will be obvious to those skilled in the art. Hence the lathe operation is not illustrated or described in detail in this application.

While the forms of mechanisms herein shown and described, constitute preferred forms of embodiments of the present invention, it is to be understood that other forms might be adopted, all coming within the scope of the claims which follow.

What I claim is as follows:

1. The method of constructing a handwheel or the like, which comprises wrapping a strip of fibrous material into a substantially circular form and suitably fastening the convolutions together to form a resilient laminated rim; cutting the rim to the desired sectional shape; cutting holes in the rim to receive the arms of a central spider; and then forcing the spider into place by expanding the spider to such an extent that the rim also is forced out of round by the spider arms a sufficient amount to cause the resiliency of said rim to maintain radial pressure upon the spider arms after the expanding force is removed.

2. The method of attaching a central spider to the rim of a handwheel or the like, which comprises cutting holes in the inner circumference of the rim to receive the arms of the central spider; placing the spider in position so that the outer extremities of its arms lie adjacent said holes; and then distorting the spider to increase the outside diameter thereof to such an extent that the rim is likewise distorted by the spider by a greater amount than that necessary to take up the retraction of the spider arms upon removal of the expanding force, whereby a permanent pressure between the rim and spider is obtained.

In testimony whereof I hereto affix my signature.

HARVEY D. GEYER.